(12) United States Patent
Zheng et al.

(10) Patent No.: US 8,740,224 B2
(45) Date of Patent: Jun. 3, 2014

(54) SEAL ASSEMBLY FOR A TURBOMACHINE

(75) Inventors: Xiaoqing Zheng, Niskayuna, NY (US);
Nathaniel Carmello Glinbizzi,
Queensbury, NY (US); **Rodrigo
Rodriguez Erdmenger**, Munich (DE);
Norman Arnold Turnquist, Carlisle,
NY (US)

(73) Assignee: General Electric Company,
Schenectady, NY (US)

( * ) Notice: Subject to any disclaimer, the term of this patent is extended or adjusted under 35 U.S.C. 154(b) by 0 days.

(21) Appl. No.: 13/406,947

(22) Filed: Feb. 28, 2012

(65) Prior Publication Data

US 2013/0221620 A1    Aug. 29, 2013

(51) Int. Cl.
*F16J 15/34*    (2006.01)

(52) U.S. Cl.
USPC ........... 277/370; 277/408; 277/409; 277/371; 277/372; 277/373

(58) Field of Classification Search
USPC .................. 277/370, 371, 372, 373, 401, 408
See application file for complete search history.

(56) References Cited

U.S. PATENT DOCUMENTS

| | | | | |
|---|---|---|---|---|
| 3,190,661 A | * | 6/1965 | Wahl et al. | 277/409 |
| 3,554,559 A | * | 1/1971 | Dahlheimer | 277/348 |
| 3,628,799 A | * | 12/1971 | Wiese | 277/401 |
| 3,782,737 A | * | 1/1974 | Ludwig et al. | 277/400 |
| 4,749,199 A | * | 6/1988 | Gresh | 277/362 |
| 6,070,881 A | * | 6/2000 | Longree | 277/409 |
| 6,135,458 A | * | 10/2000 | Fuse | 277/401 |
| 6,145,843 A | * | 11/2000 | Hwang | 277/400 |
| 6,386,547 B2 | * | 5/2002 | Wu et al. | 277/400 |
| 6,431,551 B1 | * | 8/2002 | Fuse et al. | 277/390 |
| 6,494,460 B2 | * | 12/2002 | Uth | 277/399 |
| 6,719,296 B2 | * | 4/2004 | Brauer et al. | 277/413 |
| 6,758,477 B2 | * | 7/2004 | Brauer et al. | 277/409 |
| 6,932,348 B2 | * | 8/2005 | Takahashi | 277/359 |
| 7,144,016 B2 | * | 12/2006 | Gozdawa | 277/399 |
| 7,708,028 B2 | | 5/2010 | Brown et al. | |
| 7,744,093 B2 | | 6/2010 | McMillan | |
| 7,819,405 B2 | * | 10/2010 | Ohama et al. | 277/370 |
| 7,827,685 B2 | | 11/2010 | McMillan | |
| 7,883,093 B2 | * | 2/2011 | Ueda et al. | 277/371 |
| 8,439,365 B2 | * | 5/2013 | Haynes et al. | 277/371 |
| 2002/0096835 A1 | * | 7/2002 | Azibert et al. | 277/370 |
| 2005/0067788 A1 | * | 3/2005 | Liang | 277/409 |

(Continued)

FOREIGN PATENT DOCUMENTS

EP    2213915 A1    8/2010
WO    2011095195 A1    8/2011

OTHER PUBLICATIONS

Extended Search Report regarding related Application No. 13157031.9-1751; dated Dec. 3, 2013; 4 pgs.

*Primary Examiner* — Vishal Patel
*Assistant Examiner* — Eugene G Byrd
(74) *Attorney, Agent, or Firm* — Cantor Colburn LLP

(57) ABSTRACT

A seal assembly for a turbomachine includes a seal ring rotatable between a first position and a second position and having a plurality of tunnels. Also included is a back ring located adjacent the seal ring and having a plurality of apertures that align with more of the plurality of tunnels of the seal ring when at the second position than at the first position. Further included is a retention piece operably connecting the seal ring and the back ring.

15 Claims, 6 Drawing Sheets

(56) References Cited

U.S. PATENT DOCUMENTS

| | | | |
|---|---|---|---|
| 2005/0134002 A1* | 6/2005 | Elliott et al. | 277/371 |
| 2008/0018054 A1* | 1/2008 | Herron et al. | 277/409 |
| 2010/0148448 A1* | 6/2010 | Pinto et al. | 277/371 |
| 2010/0150715 A1 | 6/2010 | Howard et al. | |
| 2010/0270749 A1* | 10/2010 | Oshii et al. | 277/361 |
| 2011/0008169 A1 | 1/2011 | Muller et al. | |

* cited by examiner

SEAL ASSEMBLY FOR A TURBOMACHINE

BACKGROUND OF THE INVENTION

The subject matter disclosed herein relates to turbomachines, and more particularly to a seal assembly for turbomachines.

In various types of turbomachines, seals are employed to provide numerous functions in conjunction with several components within the turbomachine. One such type of seal is a non-contacting face seal that typically operates at a clearance of a few mils (thousandths of an inch) or less. While providing functional advantages such as small leakage, reduced wear and being insensitive to radial runouts, inefficiencies persist. Due to several factors, including manufacturing tolerances and errors, for example, hydrodynamic or hydrostatic features that provide opening forces may be rendered inadequate, which may then lead to self-feeding rub between turbomachine components and undesirable system consequences associated therewith.

BRIEF DESCRIPTION OF THE INVENTION

According to one aspect of the invention, a seal assembly for a turbomachine includes a seal face on a seal ring rotatable between a first position and a second position and having a plurality of tunnels. Also included is a back ring located adjacent the seal ring and having a plurality of apertures that align with more of the plurality of tunnels in the seal ring when at the second position than when at the first position. Yet further included is a retention piece operably connecting the seal ring and the back ring.

According to another aspect of the invention, a seal assembly for a turbomachine includes a relatively circular seal face. Also included is a seal ring rotatable between a first position and a second position and having a plurality of tunnels. Further included is a back ring located adjacent the seal ring and having a plurality of apertures. At least one of the plurality of tunnels is open to the relatively circular seal face at an end and covered by the back ring at another end when the seal ring is at the first position. Yet further included is a retention piece operably connecting the seal ring and the back ring, wherein the seal ring is rotatable relative to the back ring.

According to yet another aspect of the invention, a seal assembly for a turbomachine includes a relatively circular seal face. Also included is a seal ring rotatable between a first position and a second position, and having a plurality of tunnels. Further included is a back ring located adjacent the seal ring and having a plurality of apertures, wherein the back ring is configured to cover at least one of the plurality of tunnels when the seal ring is in the first position, at least one of the plurality of apertures uncovering a tunnel in the second position. Yet further included is a retention piece operably connecting the seal ring and the back ring, wherein the seal ring is rotatable relative to the back ring.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
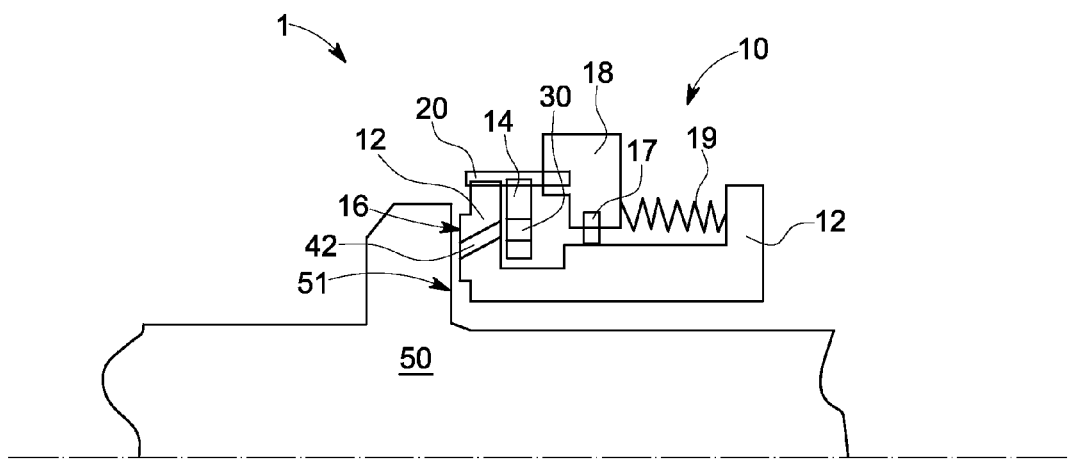
FIG. 1 is a side elevational view of a seal system.

Referring to FIG. 1, illustrated is a seal system 1 for use within a turbomachine (not shown), such as a turbine system and includes a rotor face 51 on a rotor 50, a seal assembly 10 including a seal ring 12, a back ring 14 and a seal face 16. The seal assembly 10 also includes a retention piece 18 that is attached to or is part of stationary component. An anti-rotation component 20 which is fixed to the retention piece 18 to prevent the seal ring 12 and the back ring 14 from rotating, while allowing them to move axially. A spring 19 is used to bias the seal ring 12 away or toward rotor face 51. The seal assembly 10 also includes a secondary seal 17 that prevents leakage between seal ring 12 and retention piece 18, and meanwhile allows the seal ring 12 to slide axially. The seal ring 12 includes a plurality of tunnels 42 that feed working fluid into the seal face 16. The back ring 14 consists of apertures 30 that coincide with some of the tunnel 42 openings at the design condition. When there is a rub between seal face 16 and the rotor face 51, the friction torque will force the seal ring 12 to rotate a predetermined amount to the hard stop. Meanwhile, the back ring 14 is not rotated. At the after-rotation position, more tunnel 42 openings coincide with the apertures 30 on the back ring 14. Therefore, more tunnels 42 are exposed to high-pressure working fluid that increases fluid pressure on the seal face 16. The increased pressure pushes the seal ring 12 away from rotor surface 51 and lets the seal system 1 operate at a larger clearance. Such a fail-safe design enables the seal system 1 to avoid further damage of the seal face 16 if rubbing occurs.

Figure 2:
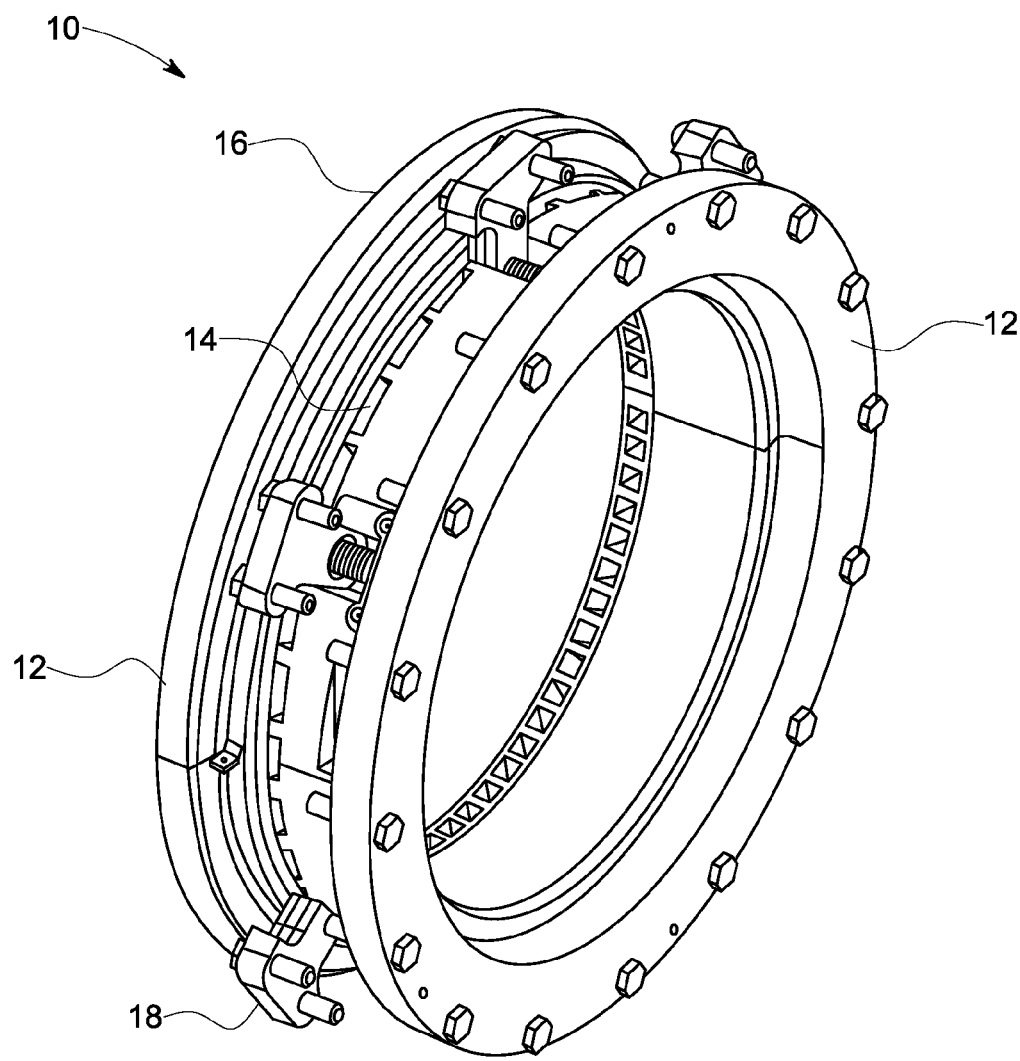
FIG. 2 is a perspective view of a seal assembly.

Referring to FIG. 2, the seal assembly 10 may be employed at various regions within the turbomachine and may be associated with various components within the turbomachine, and particularly between a high pressure region and a low pressure region (relative to one another). In such an application, the seal assembly 10 is relatively circular, and is disposed to at least partially surround the rotor 50 and provide sealing in desirable locations. The seal assembly 10 is a non-contacting seal assembly that operates with a clearance of less than approximately ten (10) mils (thousandths of an inch) from the rotor face 51. The fail-safe design allows the seal system 1 to operate at a close clearance in a reliable manner.

Figure 3:
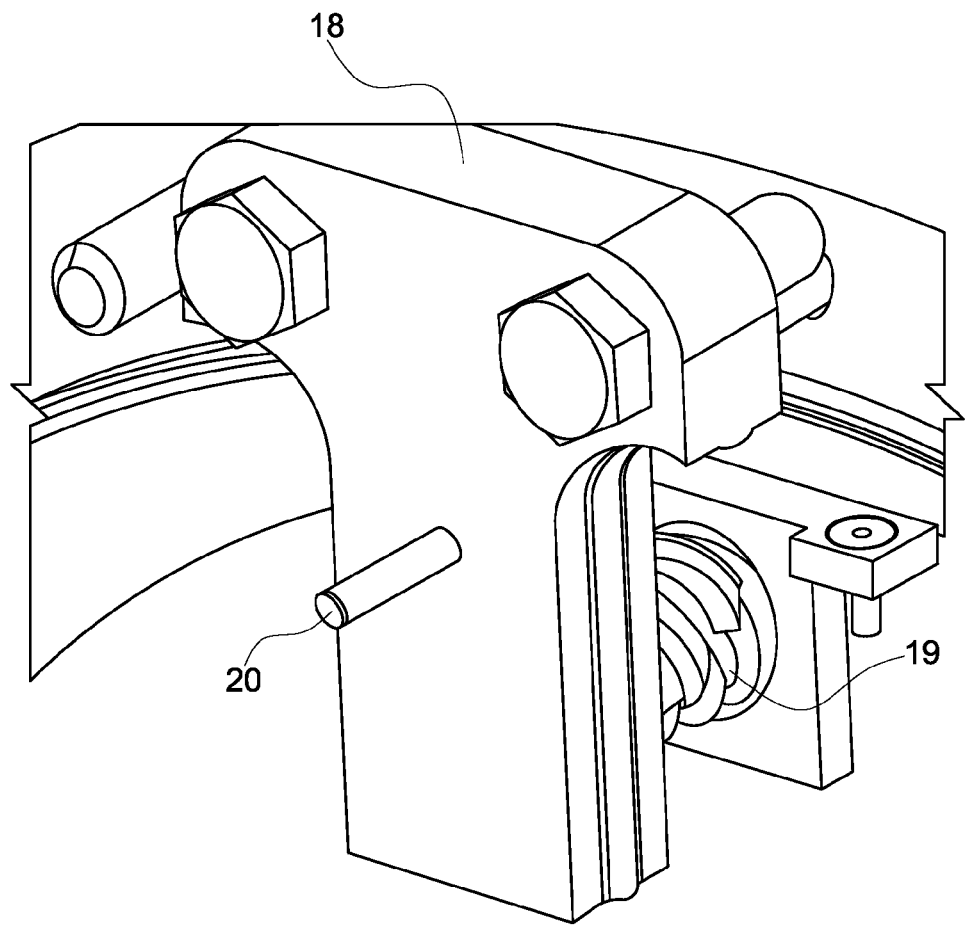
FIG. 3 is a perspective view of a retention piece having a securing pin.

Referring to FIG. 3, a portion of the retention piece 18 is disposed adjacent to the seal face 16 and may be indirectly coupled to the seal ring 12 rear end by the spring 19. The retention piece 18 includes a securing pin 20 that extends axially forward toward the seal face 16. As described above, the seal assembly 10 may be employed in various regions of the turbomachine and at various orientations, however, in the illustrated examples and for the purpose of this description, the seal assembly 10 is oriented proximate an outer surface of the rotor 50 of the aforementioned turbine assembly.

Figure 4:
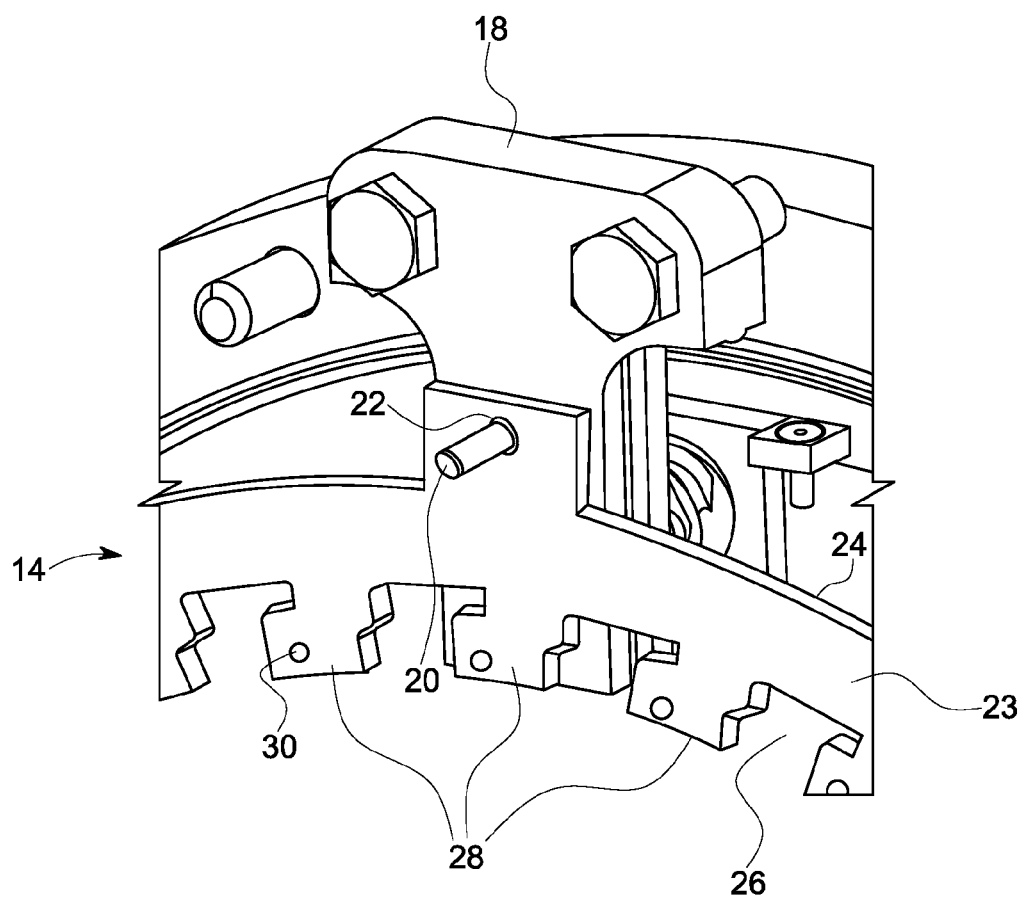
FIG. 4 is a perspective view of a back ring secured by the retention piece.

Referring to FIG. 4, the back ring 14 includes a pin receiving through-hole 22 that receives the securing pin 20 for anti-rotation purposes in a mating manner. The back ring 14 includes a base portion 23 that extends circumferentially in a substantially circular or elliptical path and the plurality of apertures. Those plurality of apertures 30 can be closed holes or open gaps between fingers 28, which may comprise simply a plate. It is contemplated that suitable alternative geometric configurations may be suitable to form the plurality of apertures 30 on the back ring 12.

Figure 5:
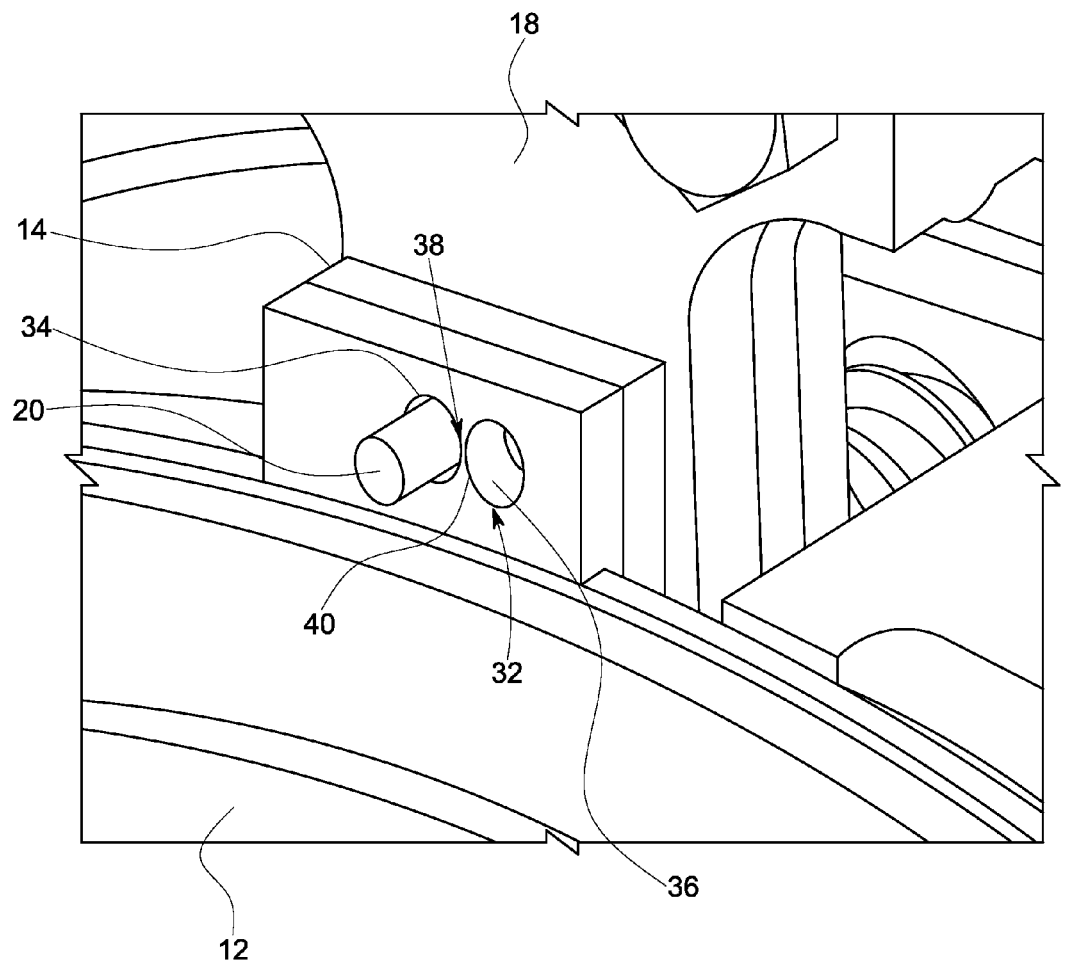
FIG. 5 is a perspective view of a seal ring operably coupled to the back ring.

Referring to FIG. 5, the seal ring 12 is disposed adjacent to, and axially forward of, the back ring 14. The seal ring 12 includes a fuse-type connection with the retention piece 18, such as a breakaway slot 32 that receives the securing pin 20 in a mating manner. In contrast to the back ring 14, which includes a pin receiving through-hole 22 that securely and rigidly prevents the back ring 14 from rotating by the retention piece 18, and therefore the seal face 16, the seal ring 12 is rotatable relative to the back ring 14 and the retention piece 18 within the length of breakaway slot 32. Rotation of the seal ring 12 may occur for numerous reasons, such as rubbing of the rotor 50 during operation, for example.

The breakaway slot 32 is comprised of at least two segments, a first receiver 34 and a second receiver 36. Both the first receiver 34 and the second receiver 36 are of sufficient diameter to surround the securing pin 20. The first receiver 34 and the second receiver 36 are separated by a thin band or a top detent 38 and a bottom detent 40. Irrespective of the separation structure between the first receiver 34 and the second receiver 36, the structural and/or frictional force imparted by the separation structure is sufficient to maintain the positioning of the securing pin 20 within either the first receiver 34 or the second receiver 36, up to a certain rotational torque. A torque exerted on the seal ring 12, such as the rubbing of the rotor 50 previously described, that is sufficient to impart rotation of the seal ring 12 will cause the seal ring 12 to overcome the frictional and/or structural force between the securing pin 20 and the first receiver 34 or second receiver 36. The torque that is sufficient to overcome the forces is dependent upon the application of use and may be modified as needed by altering the separation structure between the first receiver 34 and the second receiver 36.

In another embodiment, the fuse-type connection can be a pin on the seal ring 12 and a breakaway slot 32 on the retention piece 18. Yet in another embodiment, the pin can be designed to be sheared upon rotor rubbing as the sacrifice feature, instead of the band in the breakaway slot 32.

Figure 6:
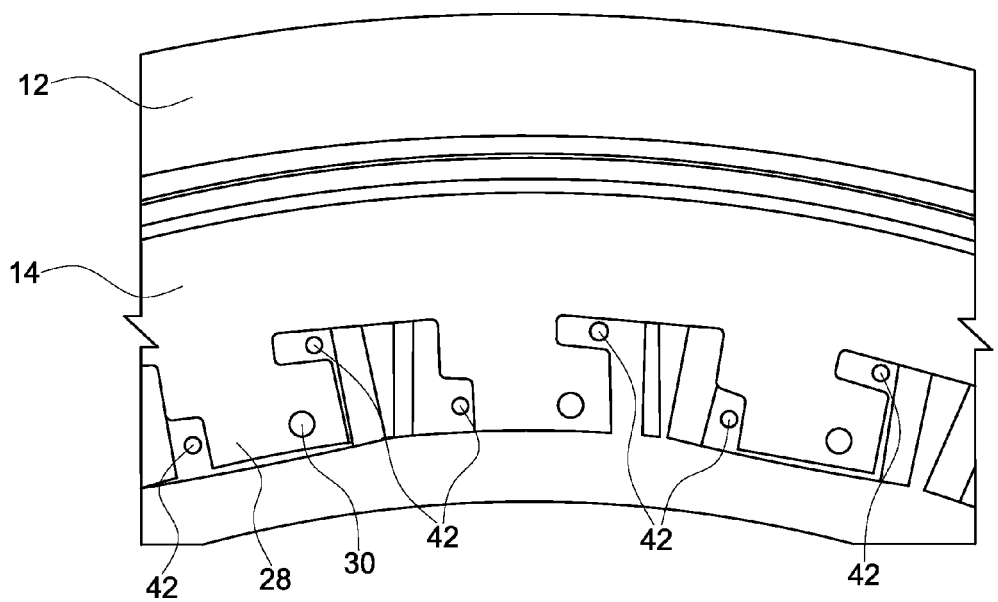
FIG. 6 is a front elevational view of the seal ring in a first position.
Figure 7:
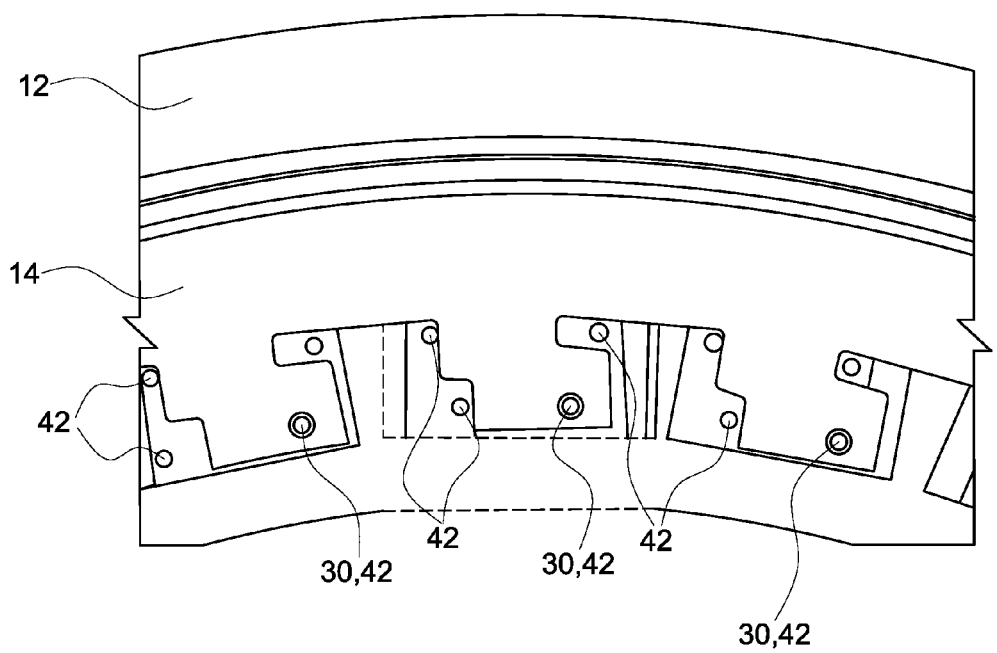
FIG. 7 is a front elevational view of the seal ring in a second position.

Referring to FIGS. 6 and 7, the seal ring 12 includes the plurality of tunnels 42 that extend axially through the seal ring 12. In a first position, corresponding to positioning of the securing pin 20 within the first receiver 34 of the breakaway slot 32 of the seal ring 12, at least one of the plurality of tunnels 42 of the seal ring 12 is covered on the axial rearward face of the seal ring 12 by the plurality of fingers 28 of the back ring 14. The number and position of the plurality of tunnels 42 is adjustable and may be modified for particular applications. Relatedly, the number and shape of the plurality of fingers 28 may be modified to provide the desired function that is determined by how many of the plurality of tunnels 42 are covered.

As described above, the seal ring 12 is rotatable relative to the back ring 14, such rotation occurring upon introduction of a force on the seal ring 12. Also previously described, such a force may cause the seal ring 12 to impart a torque sufficient to drive the securing pin 20 from the first receiver 34 of the breakaway slot 32 to the second receiver 36 of the breakaway slot, or vice versa. Upon moving from the first position to the second position, where the securing pin 20 is in the second receiver 36, additional plurality of tunnels 42 of the seal ring 12 are uncovered by the back ring 14, and specifically the plurality of fingers 28 of the back ring 14. To assist in facilitation of the uncovering of the plurality of tunnels 42, each of the plurality of fingers 28 includes at least one aperture 30 to correspond to one of the plurality of tunnels 42 when the seal ring 12 is disposed in the second position, as illustrated in FIG. 6.

Uncovering of some or all of the plurality of tunnels 42 advantageously allows high pressure air to flow through the plurality of tunnels 42 and separate the seal ring 12 from the seal face 16, or any other adjacent structure, such as a bearing. Such a seal assembly 10 reduces the likelihood of seal rub.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A seal assembly for a turbomachine comprising:
a seal ring rotatable between a first position and a second position, and having a plurality of tunnels;
a back ring located adjacent the seal ring and having a plurality of apertures that align with more of the plurality of tunnels of the seal ring when at the second position than when at the first position; and
a retention piece operably connecting the seal ring and the back ring, wherein the back ring is coupled to the retention piece via an anti-rotation component, the seal ring is coupled to the retention piece via a connection that allows the seal ring to rotate from the first position to the second position, the anti-rotation component including a securing pin, the securing pin operably coupling the back ring to the retention piece, the connection between the seal ring and the retention piece including a breakable slot the securing pin, the securing pin coupling the seal ring to the retention piece at the first position under normal operation.

2. The seal assembly of claim 1, wherein the back ring is configured to cover at least one of the plurality of tunnels when the seal ring is in the first position.

3. The seal assembly of claim 2, wherein the back ring is configured to uncover the plurality of tunnels when the seal ring is in the second position.

4. The seal assembly of claim 3, wherein at least one of the plurality of apertures is an open slot.

5. The seal assembly of claim 3, wherein a higher pressure is imposed on a seal face when the seal ring is in the second position than when the seal ring is in the first position.

6. The seal assembly of claim 1, wherein the breakable slot includes a first portion and a second portion, wherein the securing pin is disposed in the first portion when the seal ring is in the first position and in the second portion when the seal ring is in the second position.

7. A seal assembly for a turbomachine comprising:
a relatively circular seal face;
a seal ring rotatable between a first position and a second position, and having a plurality of tunnels;
a back ring located adjacent the seal ring and having a plurality of apertures;
at least one of the plurality of tunnels is open to the relatively circular seal face at an end and covered by the back ring at another end when the seal ring is in the first position; and
a retention piece operably connecting the seal ring and the back ring, wherein the seal ring is rotatable relative to the back ring, wherein the back ring is coupled to the retention piece via an anti-rotation component, the seal ring is coupled to the retention piece via a connection that allows the seal ring to rotate from the first position to the second position, the anti-rotation component including a securing pin, the securing pin operably coupling the back ring to the retention piece, the connection between the seal ring and the retention piece including a breakable slot the securing pin, the securing pin coupling the seal ring to the retention piece at the first position under normal operation.

8. The seal assembly of claim 7, wherein the plurality of apertures of the back ring are configured to align with at least one of the plurality of tunnels when the seal ring is in the first position.

9. The seal assembly of claim 8, wherein at least one more tunnel is aligned with the plurality of apertures when the seal ring is in the second position than when in the first position.

10. The seal assembly of claim 9, wherein a higher pressure is imposed on the relatively circular seal face when the seal ring is in the second position than when the seal ring is in the first position.

11. The seal assembly of claim 7, wherein the breakable slot of the seal ring includes a first portion and a second portion, wherein the securing pin is disposed in the first portion when the seal ring is in the first position and in the second portion when the seal is in the second position.

12. The seal assembly of claim 7, wherein the seal assembly is disposed proximate an outer surface of a rotor.

13. A seal assembly for a turbomachine comprising:
a relatively circular seal face;
a seal ring rotatable between a first position and a second position, and having a plurality of tunnels;
a back ring located adjacent the seal ring and having a plurality of apertures, wherein the back ring is configured to cover at least one of the plurality of tunnels when the seal ring is in the first position, at least one of the plurality of apertures uncovering a tunnel in the second position; and
a retention piece operably connecting the seal ring and the back ring, wherein the seal ring is rotatable relative to the back ring, wherein the back ring is coupled to the retention piece via an anti-rotation component, the seal ring is coupled to the retention piece via a connection that allows the seal ring to rotate from the first position to the second position, the anti-rotation component including a securing pin, the securing pin operably coupling the back ring to the retention piece, the connection between the seal ring and the retention piece including a breakable slot the securing pin, the securing pin coupling the seal ring to the retention piece at the first position under normal operation.

14. The seal assembly of claim 13, wherein the seal assembly is disposed proximate an outer surface of a rotor.

15. The seal assembly of claim 13, wherein a higher pressure is imposed on a seal face when the seal ring is in the second position than when the seal ring is in the first position.

* * * * *